United States Patent [19]

Russell et al.

[11] 3,960,813

[45] June 1, 1976

[54] ZINC CHLORIDE AS CATALYST FOR EPOXY/ADNC BLENDS

[75] Inventors: Donald H. Russell, Cherry Hill, N.J.; R. Warren Lenton, Glenolden, Pa.

[73] Assignee: Atlantic Richfield Company, Los Angeles, Calif.

[22] Filed: Feb. 13, 1974

[21] Appl. No.: 442,275

[52] U.S. Cl. .......................... 260/47 EP; 260/2 BP; 260/2.5 A; 260/2.5 EP; 260/31.2 N; 260/31.8 E; 260/37 EP; 260/75 EP; 260/77.5 B; 260/77.5 R; 260/79; 260/830 R; 260/830 TW; 260/836; 260/837 PV; 428/263; 526/237; 526/260

[51] Int. Cl.² .......................................... C08G 30/10

[58] Field of Search ............... 260/2 BP, 2 N, 2 EP, 260/47 EN, 47 EC, 47 EP, 77.5 R, 307 A, 78.4 EP, 79.3, 830 TW, 18 PF, 75 EP

[56] References Cited
UNITED STATES PATENTS

| | | | |
|---|---|---|---|
| 3,020,262 | 2/1962 | Speranza | 260/47 |
| 3,480,595 | 11/1969 | Burk, Jr. et al. | 260/2.5 R X |
| 3,507,900 | 4/1970 | Burk et al. | 260/77.5 AT X |
| 3,817,938 | 6/1974 | Ashida et al. | 260/77.5 R |

OTHER PUBLICATIONS

Journal of Polymer Science, P:A–1, Sandler, vol. 5, (1967), pp. 1481–1485.

*Primary Examiner*—Murray Tillman
*Assistant Examiner*—T. Pertilla
*Attorney, Agent, or Firm*—Coleman R. Reap

[57] ABSTRACT

A polyoxazolidone composition is prepared by heating a reaction mixture comprised of a cyclic nitrile compound, an epoxide, a metal halide catalyst, and, optionally, a polyhydroxyl, polyamine or polythiol containing compound. The reaction mixture may be stable at normal handling and storage temperatures and may be in the form of a dry powder or a liquid.

18 Claims, No Drawings

ZINC CHLORIDE AS CATALYST FOR EPOXY/ADNC BLENDS

RELATED CASE

Copending U.S. patent application Ser. No. 442,274, filed on Feb. 13, 1974, by D. H. Russell and R. W. Lenton discloses and claims the preparation of urethane-type compositions by the reaction of cyclic nitrile compounds with nucleophilic compounds in the presence of a metal halide catalyst.

BACKGROUND OF THE INVENTION

This invention relates to oxazolidone-containing polymers and more particularly to their preparation from storage-stable one-package compositions.

Interest in high molecular weight polyoxazolidones has increased recently because of the high temperature resistance of these polymers. Several methods for preparing oxazolidones are known but many of these are not practical because of the high cost of preparation of reactants suitable for use in producing high molecular weight polyoxazolidones. The preparation of 2-oxazolidones is reviewed by Dyen and Swern in Chemical Revisions, vol. 67, 1967, pp. 197–246. Ashida and Frisch, in the Journal of Cellular Plastics, July/August, 1972, pp. 194–200, discuss the preparation of oxazolidone modified isocyanurate foams by the reaction of phenyl isocyanate and phenyl glycidyl ether. Dileone in Journal of Polymer Science, vol. 8, 1970, pp. 609–615 discusses the synthesis of poly 2-oxazolidones from diisocyanates and diepoxides.

The preparation of oxazolidone group-containing polymers by reaction of isocyanates and epoxides is of interest because of the possibility of forming various polymeric systems by varying the functionality and relative concentrations of the reactants and by including other components in the reaction mixture. For example, very high molecular weight thermoplastic polymers can be prepared from difunctional reactants whereas highly crosslinked polymers can be prepared from reactants having more than two functional groups per molecule. The latter are excellent for preparing polymeric foams. By varying the ratio of isocyanate groups to epoxy groups, oxazolidone-containing isocyanurate polymers, polyoxazolidones or oxazolidone-containing polyether compounds can be prepared. By including polyol, polyamine or polythiol components in the formulation, polyoxazolidone-containing urethane urea or thiourethane polymers can be prepared.

The use of isocyanates in the preparation of oxazolidone-containing polymers or storage-stable oxazolidone-forming compositions is undesirable because of the highly toxic nature of isocyanates, particularly aliphatic isocyanates, from which ultraviolet light-stable compounds are prepared. Furthermore, because of their great reactivity with epoxides, alcohols, and water, they do not readily lend themselves to one package storage-stable polyoxazolidone-forming systems. Because of the disadvantages of using isocyanates in the preparation of oxazolidone-containing polymers, improved epoxide-containing systems are constantly being sought which have good storage stability and which produce superior polyoxazolidone compositions.

A polyoxazolidone-forming system having good storage stability and which produces a superior oxazolidone-containing polymer of the above-described character has now been discovered.

Accordingly, it is one object of the invention to present an improved method of preparing oxazolidone-modified polymers. It is another object of the invention to present a new method of preparing oxazolidone-modified polymers from epoxides. It is another object of the invention to present a method of preparing ultraviolet light-stable oxazolidone modified polymers without the necessity of using aliphatic isocyanates. It is another object of the invention to present novel one-package storage-stable polyoxazolidone-forming systems. These and other objects of the present invention will become apparent from the following description and examples.

SUMMARY OF THE INVENTION

The above objects are accomplished by preparing oxazolidone containing polymers from cyclic nitrile compounds and epoxides by reaction in the presence of a catalyst system comprised of a halide of a metal of Groups IIb, IIIa, IVa or VIII. A polyhydroxyl, polyamine or polythiol compound may be present in the reaction mixture. The reaction mixture is stable at ordinary storage temperatures but reaction is initiated by heating the mixture to about 150°C. The preferred catalyst is zinc chloride.

DESCRIPTION OF THE INVENTION

The term cyclic nitrile compound is used to describe compounds containing

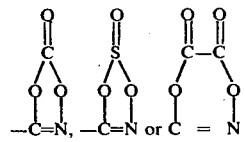

groups.

The term epoxide is used to describe organic compounds containing one or more

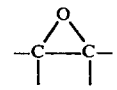

groups.

The term organic nucleophilic compound is used herein to describe organic compounds having active hydrogen atoms as determined by the Zerewitinoff test.

The term oxazolidone-containing polymers is used to describe polymers from the reactants described and which contain oxazolidone groups,

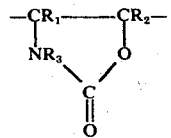

wherein $R_1$, $R_2$ and $R_3$ may be hydrogen or the same or different organic radicals.

The novel high molecular weight compositions of this invention are obtained by the reaction of cyclic nitrile compounds with epoxides alone or with mixtures of epoxides and nucleophilic compounds, particularly polyols, polyamines, and polythiols. The reaction is carried out in the presence of a metallic halide catalyst, pigments, and fillers (if desired). Depending upon the particular type of product desired, i.e., coating, film, elastomer, foam or the like, the reaction techniques can be varied somewhat to produce the desired result, as will be described hereinafter. The reaction mixture may be storage stable. The reactants, catalysts, and other additives are set forth in greater detail below.

Most of the reaction mixtures described below have good storage stability at ordinary temperatures. By virtue of the metallic halide used in the invention, mixtures of the various reactants can be prepared which react only at elevated temperatures, i.e., above about 140°C. Thus, reaction mixtures can be prepared as one-package products which can be handled or stored for indefinite periods of time at ordinary environmental temperatures. When it is desired to use them, they are simply deposited on the surface to be treated and heated to the reaction temperature. Since cyclic nitrile compounds are much less toxic than the corresponding isocyanates, the polymer-forming compositions of this invention are much safer to handle and, thus, suitable for use by laymen.

THE CYCLIC NITRILE COMPOUNDS

The cyclic nitrile compounds used in the invention have the structure

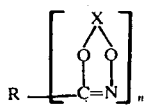

wherein X is carbonyl,

thionyl,

or oxalyl,

n is at least 2, and R is an organic radical having from 2 to about 200,000 carbon atoms and is free of reactive hydrogens as determined by the Zerewitinoff test. A compound which contains a reactive hydrogen as determined by the Zerewitinoff test is one which, when contacted with a Grignard solution of methyl iodide, will effect the liberation of methane by decomposition of the Grignard reagent. Frequently, R will consist essentially of carbon and hydrogen atoms; and by "consisting essentially of carbon and hydrogen" is meant that the essential composition of the radical is carbon and hydrogen but that there can be included therein other elements as well, so long as they do not materially affect the radical's basic characteristic of being noninterfering in the condensation reaction of the cyclic nitrile group with the epoxy, hydroxyl or thiol groups. Examples of non-interfering groups which can be present in R and which contain elements other than carbon and hydrogen are alkoxy, nitro, and halo groups. The R radical can be aromatic, e.g., of 1 to 3 aromatic rings (fused or non-fused) or non-aromatic and when the latter, can be cyclic or acyclic and saturated or ethylenically or acetylenically unsaturated. Acyclic R's can be straight or branched chain. The cyclic nitrile carbonate group can be attached to an aromatic ring carbon atom, to a cycloaliphatic ring carbon atom or to a non-ring carbon atom.

R often contains from 2 to 50 carbon atoms when it is aliphatic and from 6 to 30 carbon atoms when it is aromatic. When R has a content in this range, it preferably contains 2 to 12 carbon atoms when aliphatic and 6 to 18 carbon atoms when aromatic. R may also be of much higher molecular weight and may contain up to 200,000 or more carbon atoms. Cyclic nitrile compounds in which R has a high molecular weight may be prepared, for instance, by polymerizing unsaturated cyclic nitrile compounds, such as acrylonitrile carbonate. The preparation of cyclic nitrile compounds of this type is disclosed in U.S. Pat. No. 3,480,595, the disclosure of which is incorporated herein by reference.

The number of cyclic nitrile functional groups present in the cyclic nitrile compounds used in the invention may vary from 2 to as high as 100,000 or more per molecule. In preparing high molecular weight polymers, it is usually desirable that $n$ be about 2. In the preferred embodiment of the invention, $n$ varies from 2 to about 6.

The preparation of the cyclic nitrile compounds useful in the invention forms no part of the invention, and one desiring to explore their preparation may refer to the above-mentioned Patents and U.S. Pat. Nos. 3,480,595; 3,507,900; 3,609,163; 3,652,507; and 3,658,805, all of which are incorporated herein by reference.

Typical of the aliphatic cyclic nitrile compounds useful in the invention are:

1. Saturated aliphatic and cycloaliphatic compounds such as 1,2-ethane di(nitrile carbonate); 1,4-butane di(nitrile sulfite); 1,20-eicosane di(nitrile oxalate); 1,40-tetracontane di(nitrile carbonate); 5-ethyl-1,16-hexadecane di(nitrile carbonate); 1,3,5-pentane tri(nitrile sulfite); 1,4,6,10-decane tetra(nitrile carbonate); 6-methyl-1,5,8-octane tri(nitrile oxalate); 1,4-cyclohexanedi(nitrile carbonate); 2-ethyl-1,3,5-cyclohexane tri(nitrile carbonate); etc.

2. Unsaturated aliphatic and cycloaliphatic compounds such as 1,2-ethene-di(nitrile carbonate); 1,4-butene-2-di(nitrile sulfite); 1,6,9-nonene-2-tri(nitrile oxalate); 3-propyl-1,5,7-heptene-2-tri(nitrile carbonate); 1,4-butyne-2-di(nitrile carbonate); 1,6-hexyne-2-di(nitrile carbonate); 1,4-cyclohexene-2-di(nitrile carbonate); etc.

3. Aromatic compounds such as benzene 1,3-di-(nitrile carbonate); benzene-1,4-di(nitrile carbonate); and 1,3-diethylbenzene-2,4-di(nitrile oxalate); methylbenzenedi(nitrile carbonate); 1-benzylbenzene-2,4-di(nitrile carbonate); naphthalene-1,7-di(nitrile carbonate); 1,2,3,4-tetrahydronaphthalene-di(nitrile carbonate); 2,2-diphenylpropane-p,p'-di(nitrile carbonate); diphenylmethane-p,p'di(nitrile carbonate); anthracene-2,8-di(nitrile carbonate); 1,2-diphenylethane-p,p'-di(nitrile carbonate); biphenyldi(nitrile carbonate); 1,2-diphenylethane-o,o'-di(nitrile oxalate);

stilbene-p,p'-di(nitrile carbonate); and stilbene-o,o'-di(nitrile sulfite).

Although cyclic nitrile sulfites and cyclic nitrile oxalates function as well as, and sometimes better than, cyclic nitrile carbonates, they are not as suitable as cyclic nitrile carbonates since the sulfites produce sulfur dioxide, an obnoxious and toxic gas, and the oxalates produce carbon monoxide, also a very toxic gas. Since the carbonates, upon reaction, release harmless and odorless carbon dioxide, these are much more suitable for general use. Thus, the preferred cyclic nitrile compounds are the saturated aliphatic cyclic nitrile carbonates in which R contains 2–12 carbon atoms, such as 1,2-ethane di(nitrile carbonate); 1,4-butane di(nitrile carbonate); and 1,4,8-octane tri(nitrile carbonate).

THE EPOXIDES

The epoxides which can be employed include the mono- and diepoxides as well as those having a multiplicity of oxirane rings. The monoepoxides are represented by the formula

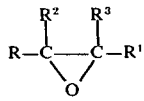

wherein R, R$^1$, R$^2$, and R$^3$ may be like or unlike radicals and may be hydrogen, alkyl, cycloalkyl or aromatic radicals. The 1,2-epoxy compounds are preferred, i.e., wherein R$^1$ is hydrogen and R is one of the enumerated radicals. Examples are respectively, propylene oxide, cyclohexene oxide (1,2-epoxycyclohexane), and styrene oxide.

Another important group of epoxides suitable for use in this invention are the diepoxides and polyepoxides including epoxy esters.

The polyepoxides comprise those materials possessing more than one vicinal epoxy group, i.e., more than one

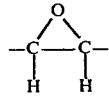

group per molecule. These compounds may be saturated or unsaturated, aliphatic, cycloaliphatic, aromatic or heterocyclic and may be substituted with substituents such as chlorine, hydroxyl groups, ether radicals, and the like. They may be monomeric or polymeric.

For clarity, many of the polyepoxides and particularly those of the polymeric type are described in terms of epoxy equivalent values. The meaning of this expression is well known. It is described, for example, in U.S. Pat. No. 2,633,458 to Shokal, the disclosure of which is incorporated herein by reference. The polyepoxides used in the present invention are those having an epoxy equivalency greater than 1.0.

The polyepoxides used may be of a single type or may be mixtures of several different types or molecular weights. Liquid or solid epoxides may be used depending upon the type of reaction mixture being prepared. For instance, solid epoxides are preferred in powder coating compositions while solid or liquid epoxides may be used when a liquid or solvent system is contemplated. Normally liquid polyepoxides are those having a Durrans mercury method softening point of up to about 30°C. and normally solid polyepoxides are those which have a higher softening point.

The polyepoxides that are particularly preferred in this invention are the glycidyl ethers and particularly the glycidyl ethers of polyhydric phenols or polyhydric alcohols. The glycidyl ethers of polyhydric phenols are obtained by reacting epichlorohydrin with the desired polyhydric phenols in the presence of alkali. Polyether A and polyether B described in Shokal, U.S. Pat. No. 2,633,458, are good examples of polyepoxides of this type. Other examples include the polyglycidyl ether of 1,1,2,3,-tetrakis-(4-hydroxyphenyl)ethane (epoxy value of 0.45 eq./100 g. and melting point 85°C.), polyglycidyl ether of 1,1,5,5,-tetrakis(hydroxyphenyl)pentane (epoxy value 0.514 eq./100g.) and the like and mixtures thereof.

Another useful group of polyepoxides are epoxidized polyethylenically unsaturated hydrocarbons such as epoxidized 2,2-bis(2-cyclohexenyl)propane, epoxidized vinylcyclohexene, and epoxidized dimer of cyclopentadiene.

Another useful group comprises the epoxidized polymers and copolymers of diolefins, such as butadiene. Examples of this include, among others, butadiene-acrylonitrile copolymers (Hycar rubbers), butadiene-styrene copolymers, and the like.

Another useful group comprises glycidyl-containing nitrogen compounds such as diglycidyl aniline and di- and triglycidylamine.

A useful group of polyepoxides which can be used in this invention are halogenated derivatives of the abovedescribed polyepoxides. For example, the diglycidyl ether of 2,2-bis-(4-hydroxy-3,5-dibromophenyl)-propane or the corresponding tetrachloro substituted compound may be used. Similarly, resins prepared like polyethers A, B or D of said Shokal patent but with tetrachloro- or tetrabromobisphenol A substituted for the bisphenol of Shokal may be used.

A class of polyepoxides which have utility in this invention consists of epoxy esters; of this group, epoxy esters of dimers and trimers of long chain unsaturated acids are described in some detail in U.S. Pat. No. 2,940,986 to Nervey, the disclosure of which is incorporated herein by reference.

Another group of epoxy esters include the epoxidized esters of unsaturated monohydric alcohols and polycarboxylic acids having the epoxy group in an internal open-chain portion of the molecule such as, for example, di(2,3-epoxybutyl)adipate, di(2,3-epoxybutyl)oxalate, di(2,3-epoxyhexyl)succinate, di(2,3-epoxyoctyl)-pimelate, di(2,3-epoxybutyl)phthalate, di(2,3-epoxyoctyl)tetrahydrophthalate, di(4,5-epoxydodecyl)-meleate, di(2,3-epoxybutyl)terephthalate, di(2,3-epoxypentyl)thiodipropionate, di(5,6-epoxytetradecyl)-diphenyldicarboxylate, di(3,4-epoxyheptyl)sulfonyldibutyrate, tri(2,3-epoxybutyl)1,2,4-butanetricarboxylate, di(5,6-epoxybutyl)azelate, di(3,4-epoxybutyl)citrate, di(5,6-epoxyoctyl)cyclohexane-1,3-dicarboxylate, di(4,5-epoxyoctadecyl)malonate.

Another group of esters includes the epoxidized ester of unsaturated monohydric alcohols and polycarboxylic acids having the epoxy group in the terminal position of an open chain portion of the molecule, such as, for example: di(2,3-epoxypropyl)adipate, di(2,3-epoxypropyl)oxalate, di-(5,6-epoxyhexyl)succinate, di(3,4- epoxybutyl)maleate, di(7,8-epoxyoctyl)pimelate, di(3,4-epoxybutyl)phthalate, di(2,3-epoxypropyl)tetrahydrophthalate, di(2,3-epoxypropyl)maleate, di(4,5-epoxypentyl)thiodipropionate, di(13,14-epoxytetradecyl)diphenyldicarboxylate, di(6,7-epoxyheptyl)-sulfonyldibutyrate, tri(2,3-epoxypropyl)1,2,4-butanetricarboxylate, di(4,5-epoxypentyl)tartarate, di(2,3-epoxypropyl)azelate, di(2,3-epoxypropyl)citrate, di(2,3-epoxypropyl)cyclohexane-1,3-dicarboxylate, di(17,18-epoxyoctadecyl)malonate.

Further esters of this type are those described in U.S. Pat. No. 2,895,947 to Shokal et al. the disclosure of which is incorporated herein by reference, namely, esters of epoxy substituted monohydric alcohols and acid components of the group consisting of aromatic polycarboxylic acids and acid esters of these acids and polyhydric compounds wherein at least two of the carboxyl groups of the acid components are esterified with the epoxy alcohol. Preferred esters of this type are di(2,3-epoxypropyl)terephthalate, di(2,3-epoxypropyl)chloroterephthalate, di(3,4-epoxyhexyl)-isophthalate, di(3,4-epoxycyclohexyl)orthophthalate, diepoxypropoxyethyl)-2-methyl-terephthalate, and the like.

Another group of suitable epoxy esters includes epoxidized esters of unsaturated alcohols and unsaturated carboxylic acids such as 2,3-epoxybutyl-3,4-epoxypentanoate, 3,4-epoxycyclohexanoate, 3,4-epoxycyclohexyl-4,5-epoxyoctanoate, 2,3-epoxycyclohexylmethylepoxymethylcyclohexane-carboxylate.

Still another group of suitable epoxy esters includes epoxidized derivatives of polyethylenically unsaturated polycarboxylic acids such as, for example, dimethyl-8,9,12,13-diepoxyeicosanedioate, dibutyl-7,8,11, 12-diepoxyoctadecanedioate, dioctyl-10,11,diethyl-8,9,12, 13-diepoxyeicosandioate, dihexyl-6,7,10,11-diepoxyhexadecanedioate, didecyl-9-epoxyethyl-10,11-epoxyoctadecanedioate, dibutyl-3-butyl-3,4,5,6-diepoxycyclohexane-1,2-dicarboxylate, dicyclohexyl-3,4,5,6-diepoxycyclohexane-1, 2-dicarboxylate, dibenzyl-1,2,4,5-diepoxycyclohexane-1,2-dicarboxylate, and diethyl-5,6,10,11-diepoxyoctadecyl succinate.

Still another group of epoxy esters comprises the epoxidized polyesters obtained by reacting a polyhydric alcohol and polycarboxylic acid or anhydride in which either one or both compounds are unsaturated such as, for example, the polyester obtained by reacting 8,9,12,13-eicosadienedioic acid with ethylene glycol, the polyester obtained by reacting diethylene glycol with 2-cyclohexene-1,4-dicarboxylic acid, and the like, and mixtures thereof.

The foregoing examples of epoxides are merely illustrative of the vast number of epoxides which can be used to produce the novel compounds of this invention by the methods of this invention. Thus, any compound having one or more oxirane rings can be used in the present invention.

THE NUCLEOPHILIC COMPOUNDS

When included in the reaction mixture, suitable organic nucleophilic compounds include compounds the active hydrogen present in —OH, —NH—, —NH$_2$, —SH, —SO$_2$NH$_2$, —SO$_2$OH, —COOH, —CSNH$_2$, and —CONHR groups. The organic nucleophilic compounds preferred for use in the invention include aliphatic and aromatic polyols, polyamines, and polythiols. and polymers such as polyester polyols, polyamines or polythiols, polyether polyols, polyamines or polythiols; and polylactones and similar compounds having from 1 to 6 or more, but preferably 3 or more, —OH, —NH—, NH$_2$ of —SH groups or mixtures of these per molecule and having 2 to about 100,000 carbon atoms with hydroxyl numbers ranging from 12 to 1,100 or more. Mixtures of two or more of these compounds can also be employed.

The aliphatic and aromatic polyols, polyamines, and polythiols include, for example, ethylene glycol; diethylene glycol; thiodiethylene glycol; propylene glycol; 1,3-butylene glycol; 1,6-hexanediol; butenediol; butynediol; amylene glycols; 2-methyl-pentanediol-2,4; 1,7-heptanediol; glycerine; neopentyl glycol; trimethylol propane, pentaerythritol; cyclohexane dimethanol; sorbitol; mannitol; glactitol; talitol; xylitol; 1,2,5,6-tetrahydroxyhexane; styrene glycol; bis (βhydroxyethyl)-diphenyl-dimethylmethane; silanediols, e.g., triphenyl silanol; 1,4-dihydroxybenzene; etc., and the corresponding amine- and thiolcontaining compounds.

The polyhydroxyl-, amine- or thiol-containing polymeric compounds useful in this invention include, for instance, polyhydric polyalkylene ethers, polyhydroxyl polyesters, and hydroxyl group-containing, preferably hydroxyl-group terminated, polymers and the corresponding thiol-containing polymers. The polyhydric, polyamine or polythiol polyalkylene ethers may have a molecular weight greater than about 350 and a hydroxyl number of from about 10 to 600 and may be derived, for example, by the polymerization of alkylene oxides, such as ethylene oxide, propylene oxide, butylene oxide, and the like. Polyhydric polyalkylene ethers may also be prepared by the polymerization of the cyclic ethers such as, for example, dioxane, tetrahydrofuran, and the like, and by the condensation of an alkylene oxide with a glycol such as ethylene glycol, propylene glycol, butylene glycol, and the like.

The hydroxyl-, amine-, and thiol-containing polyesters may be obtained by the reaction of aliphatic or aromatic dicarboxylic acids with aliphatic or aromatic polyhydric, polyamine or polythiol alcohols in the manner well known to the art in proportions that result in esters having at least two reactive hydroxy, amino or mercaptan groups. Any polyols, polyamine or polythiol alcohols may be used to form the esters, aminoesters, and thioesters and illustrative of such alcohols, amines, and thiols are those listed above in the discussion of suitable alcohols, amines, and thiols as the active hydrogen-containing reactant. Included within the suitable esters, aminoesters, and hydroxyl-containing thioesters are the mono and diglycerides of castor oil, tall oil, soya oil, linseed oil, etc., and the corresponding amine and thio esters. The latter esters, aminoesters, and thioesters are usually prepolymers prepared by the reaction of the fatty glyceride with low molecular weight polyhydric, polyamine or polythiol alcohols. Illustrative, for instance, of castor oil-based prepolymers are propylene glycol monoricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride or ricinoleic acid, epoxidized castor oil, and pentaerythitol tetraricinoleate and the corresponding amine and thiol prepolymers. Other suitable polymers, such as those derived from 1,4-butadiene; isoprene; 2,3-dimethylbutadiene; 2-chloro-1,3-butadiene; 2-cyano-1,3-butadiene; and other polymerizable ethylenically unsaturated monomers such as α-olefins of up to 12 carbon atoms such as ethylene, propylene, butene, etc.; styrene, acrylonitrile, acrylic acid or ester, methacrylic acid or ester, vinyl chloride, vinylidine chloride, and the like; hydroxyl-terminated condensates of phenol and lower aldehydes and hydroxy-terminated polyepoxides. A particularly suitable hydroxyl-containing compound is styrene-allyl alcohol copolymer, made by copolymerizing styrene and allyl acetate and partially or fully hydrolyzing the acetate groups to alcohol groups.

When compositions having a considerable storage life are to be prepared and they are to contain nucleophilic compounds, it is preferable that the functional groups on the nucleophilic compounds be either hydroxyl or thiol groups since amine groups are too reactive with cyclic nitrile groups to form a stable reactable composition of any practical significance.

The most preferred compounds are the polyols, particularly the polyester and polyether polyols.

The functionality of the cyclic nitrile component and the organic nucleophilic components is at least 2. As mentioned earlier, the epoxide may contain a single epoxy group per molecule since it produces a hydroxyl group upon ring opening. It is often desirable that the functionality of one or all of the reacting components be higher than 2. In general, it is preferred that the cyclic nitrile compounds used have a functionality of two and the functionality of the epoxides and organic nucleophilic compounds be varied since it is much more economical to prepare polyfunctional epoxide and nucleophilic compounds than polyfunctional cyclic nitrile compounds.

The ratio of cyclic nitrile compound to epoxide compound may vary depending upon the desired properties of the product, amount of nucleophilic compound present, and the functionality of the reacting materials. In general, it is desired to use amounts of cyclic nitrile compound and epoxide that will provide a ratio of cyclic nitrile functional group to total epoxyhydroxyl, amine, and thiol group of about 0.7 to 10:1 and preferably about 0.7 to 1.4:1.

THE CATALYST

The catalyst used in the reaction mixtures of the invention is comprised of a halide of a metal of Groups IIb, IIIa, IVa, and VIII of the Periodic Table of the Elements. The term halide includes fluorides, chlorides, bromides, and iodides. Suitable catalysts include $ZnCl_2$, $ZnF_2$, $ZnBr_2$, $ZnI_2$, $CdCl_2$, $AlF_3$, $AlCl_3$, $SnCl_4$, $SnBr_4$, $SnCl_2Br_2$, $SnCl_2$, $FeCl_3$, $FeBr_3$, etc. The preferred catalysts are the chlorides and bromides of these metals, and $ZnCl_2$ and $ZnBr_2$ are the most preferred catalysts.

The amount of catalyst employed will vary depending upon the type of product, the reaction temperature, and the desired properties of the product. By way of example, the catalyst is desirably present in an amount of from about 0.01% to about 5%, preferably from about 0.1 to about 2% by weight, based on the total weight of the reactive components in the reaction mixture. Amounts above or below these ranges may sometimes be effectively used but it is preferred that the catalyst concentration be within these limits.

The reaction is generally carried out at a temperature between about 140°C. and 300°C. and preferably between 160°C. and 250°C.

When shelf-stable compositions are prepared, they may be either in the dry powdered state or the liquid state. Dry powdered reaction compositions are preferably prepared from solid components although one or more of the components may be liquid provided that there is a sufficient amount of dry components to completely absorb the liquid components so that a free flowing powder can be prepared. The dry powdered reaction compositions of the invention are particularly suitable for use in powder coating processes such as electrostatic powder spray or fluid bed systems. These techniques are described in copending commonly owned U.S. patent application Ser. No. 424,487, filed on Dec. 13, 1973, in the names of D. H. Russell and K. C. Frisch, Docket No. PF 50-01-1457A, incorporated herein by reference.

When the storage-stable compositions of the invention are intended for application by conventional coating methods such as spraying or brushing techniques, it may be made from solid or liquid reactants and diluted, as desired, with volatile organic solvents. Suitable solvents commonly used in coating film-forming or adhesive technology include anhydrous ethyl acetate, butyl acetate, methyl ethyl ketone, methyl isobutyl ketone, xylene, toluene, benzene, cellosolve acetate (2-ethoxyethyl acetate), and the like.

To produce coatings, films, foams, etc. by the process of the invention, the reaction composition is applied to the surface to be treated and heated to a temperature of about 140° to 300°C. and preferably 160 to 250°C. until the desired cure is attained. The cure time will vary depending upon the catalyst used, the cure temperature, the equivalent ratio of the reactants, and the physical properties sought. In general, times ranging from 5 minutes to 1 hour are satisfactory.

The products prepared by the reaction of this invention may vary over a wide range in type and physical properties. If the sole reactive components are cyclic nitrile compounds and epoxides and the number of functional groups of both reactants are approximately equal, the product will be predominantely polyoxazolidone. If the number of cyclic nitrile functional groups exceeds the number of epoxy groups by a substantial margin, there will be a considerable number of isocyanurate groups present in addition to the oxazolidone groups. If the epoxy groups are present in a large excess, the product will contain a large number of ether linkages in addition to the oxazolidone groups. If a nucleophilic compound is present, the product will contain urethane, thiourethane, and/or urea linkages in addition to the oxazolidone. As mentioned earlier, the properties of the product can be varied considerably by varying the amount, type, and degree of functionality of the reaction components.

It is possible in accordance with the present invention to produce cellular or nonporous plastics, including films, coatings, adhesive layers, impregnated compositions, castings, moldings, and the like from the compositions of the invention. However, in the production of foams by the process of the invention, it is not necessary, as it is in conventional prior art processes, to employ an extraneous foaming or blowing agent since the cyclic nitrile compound reactants contain their own internal or "built in" blowing agent, namely, the gas they evolve during reaction with the epoxide and nucleophilic compounds. Conventional foaming agents, however, may be employed if desired, among which may be listed low boiling hydrocarbons such as pentane, hexane, cyclohexane, and the like, as well as agents which will decompose to evolve as inert gas as, for instance, ammonium carbonate, sodium bicarbonate, N,N'-dimethyl-N,N'-dinitroso-terephthalamide; para, para'-oxybis (benzenesulfonic acid); azodicarbonamide; benzene sulfonyl hydrazide; axodiisobutyronitrile; paratertiary butyl benzoylazide, and the like.

Formulation of foams can follow the well-established practice of the art with the notable exception that the conditions of the reaction between the cyclic nitrile compounds and epoxides and nucleophilic compounds be controlled to effect the reaction at a rate slow enough to preclude escape of the evolved gas before gelation to the extent sufficient to entrap the evolved gas and form a cellular product has occurred.

When preparing foamed products by the method or from the compositions of the present invention, it is generally preferred to employ at least a trifunctional reactant, which can be any or all of the cyclic nitrile compound, the epoxide, and the nucleophilic compound. Thus, for example, excellent polyoxazolidone foams can be prepared by condensing a difunctional cyclic nitrile compound with a trifunctional epoxide to yield a cross-linked product.

If desired, surface active agents may be included in concentrations of about 0.1 to 5% by weight of the reactants to stabilize the foam. Generally used are silicone emulsifiers and non-ionic surface active agents, such as ethylene oxide condensates of vegetable oils, alcohols, and organic acids.

In accordance with the usual practice, inert, inorganic or organic fillers or both, and other additives may be included in the reaction mixture. Suitable inert, inorganic materials include, for example, clay, talc, silica, carbon black, asbestos, glass, mica, calcium carbonate, antimony oxide, and the like. Organic fillers include, for instance, the various polymers, copolymers, and terpolymers of vinyl chloride, vinyl acetate, acrylonitrile, acrylamide, styrene, ethylene, propylene, butadiene, divinylbenzene, etc. Other additives which may be added include plasticizers, such as dioctyl phthalate, di(2-ethylhexyl)adipate, etc., extenders, softeners, coloring agents, and emulsifiers.

The polymeric products produced by the invention have many uses. For example, they are excellent materials for use in the preparation of castings, molds, sealants, potting compounds, adhesives, coatings, films, foams, etc. They have high melting points and high impact resistance.

The following Examples illustrate specific embodiments of the invention. Unless otherwise indicated, parts and percentages are on a weight basis.

EXAMPLE I

To a suitable container are added 100 parts of 2-ethoxyethyl acetate (solvent); 15.2 parts of adipodi(nitrile carbonate) (ADNC); 60.2 parts of an epoxy resin prepared by condensing epichlorohydrin and bisphenol A and having an equivalent weight of 905 (sold by Shell Chemical Company under the trademark Epon 1004); 24.6 parts of propylene oxide-based epoxy resin prepared by condensing a glycol and epichlorohydrin and having an equivalent weight of 369 (sold by Dow Chemical Company under the trademark D.E.R. 741); and 1 part of anhydrous zinc chloride (catalyst). The mixture is heated at 75°–90°C. with stirring until a clear solution is obtained. The solution is cooled to room temperature and applied to a degreased mild steel panel at a thickness of about 2 mils. The film is cured for 30 minutes at 170°C. The cured film is tested and the results are reported in Table I under column I.

A sample of reaction mixture similar to that prepared in Example I shows no viscosity increase after two months storage at room temperature under anhydrous conditions.

EXAMPLE II

The procedure of Example I is repeated except that the formulation is 15.5 parts of ADNC; 73.5 parts of Epon 1004; 7.5 parts of D.E.R. 741; and 3.5 parts of a tetrol having an equivalent weight of 101 (sold by Wyandotte Chemical Company under the trademark Pep 450). The amount of solvent and catalyst are the same as is used in Example I. The cured panels are tested and the results reported in Table I under Column II.

EXAMPLE III

The procedure of Example I is repeated except that the formulation is 39.9 parts of ADNC; 4.1 parts of Pep 450; and 56 parts of an epoxy resin prepared by reacting epichlorohydrin and bisphenol A and having an equivalent weight of 188 (sold by Shell Chemical Company under the trademark Epon 828). The amount of solvent and catalyst is the same as used in Example I. The cured panels are tested and the results reported in Table I under column III.

EXAMPLE IV

The procedure of Example I is repeated except that the reactants are ADNC, Epon 1004, Pep 450, and an epoxide terminated propylene oxide polymer (sold by Dow Chemical Company under the trademark D.E.R. 741). The reactants are present in sufficient quantity to provide a ratio of functional equivalents of 1/0.6/0.25/0.15 (in the order that the reactants are listed). The solvent, 2-ethoxyethyl acetate, is present in an amount sufficient to provide a 50% by weight solution of the reactants. The catalyst is present in an amount of 1% based on the weight of the reactants. The only variable in this series of runs is the catalyst. The results of tests conducted on the films are tabulated in Table II.

Example IV shows that useful polymeric compounds can be prepared from ADNC, an epoxide, and a polyhydroxyl compound using various metal halide catalysts.

Although the invention has been described with reference to specific examples, it is to be understood that the scope of the invention is limited only by the breadth of the appended claims.

TABLE I

| EXAMPLE | I | II | III |
|---|---|---|---|
| Pencil Hardness | H/2H | H/2H | 4H/5H |
| Gardner Reverse Impact (in.-lbs.) | >160 | >160 | >160 |
| 1/4" Mandrel Bend | Pass | Pass | Pass |
| Solvent Resistance | | | |
| Xylene | Pass | Pass | Pass |
| Acetone | Fail | Pass | Pass |
| Boiling Water | Pass | Pass | Pass |

TABLE II

| Run | 1 | 2 | 3 | 4 | 5 | 6 |
|---|---|---|---|---|---|---|
| Catalyst | $ZnCl_2$ | $AlCl_3$ | $ZnBr_2$ | $SnCl_2$ | $FeCl_3$ | $CdCl_2$ |
| Cure Temp., °C. | 170 | 170 | 170 | 170 | 170 | 170 |
| Cure Time, Min. | 90 | 90 | 90 | 90 | 90 | 90 |
| Film Thickness, Mils | 1.0 | 0.85 | 0.80 | 0.80 | 0.70 | 0.75 |
| Gardner Impact (in.-lbs.) | | | | | | |
|   Direct | 160 | 160 | 160 | 160 | 160 | 160 |
|   Reverse | 160 | 160 | 160 | 160 | 160 | 160 |
| 1/4" Mandrel Bend | Pass | Pass | Pass | Pass | Pass | Pass |
| Pencil Hardness | 4H | 5H | 5H | 5H | 5H | 4H |
| Solvent Resistance | | | | | | |
|   Acetone | Pass | Pass | Pass | Fail | Pass | Fail |
|   Xylene | Pass | Pass | Pass | Pass | Pass | Pass |
|   Boiling Water | Pass | Fail | Fail | Pass | Fail | Fail |

I claim:

1. A storage-stable polyoxazolidone-forming composition comprised of
   A. A cyclic nitrile compound having the structural formula

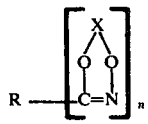

wherein X is

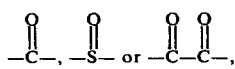

R is an organic radical free of reactive hydrogens as determined by the Zerewitinoff Test and n is at least 2,
   B. An oxirons epoxide, and
   C. About 0.1 to 5% based on the total weight of (A) and (B) of a halide of a metal of Groups IIb, IIIa, IVa, and VIII of the Periodic Table,
   the cyclic nitrile compound and the epoxide being present in amounts such that the ratio of cyclic nitrile groups to epoxy groups is about 0.7 to 10:1.

2. The composition of claim 1 wherein (B) has at least 2 epoxy groups per molecule.

3. The composition of claim 1 wherein (C) is present in an amount of about 0.1 to 2% based on the total weight of (A) and (B).

4. The composition of claim 1 wherein (C) is a halide of a metal selected from the group consisting of zinc, cadmium, aluminum, tin, and iron.

5. The composition of claim 4 wherein said halide is a chloride or a bromide.

6. The composition of claim 5 wherein said metal halide is zinc chloride.

7. The composition of claim 1 further including at least one organic compound having at least two groups per molecule selected from the class consisting of organic polyols, organic polythiols, and mixtures of these.

8. The composition of claim 1 in powder form having a particle size of about 10 to 500 microns.

9. The composition of claim 8 having a particle size of about 50 to 250 microns.

10. The composition of claim 1 in liquid form.

11. The composition of claim 1 dissolved in an inert, volatile organic solvent.

12. The composition of claim 1 wherein the ratio of cyclic nitrile groups to epoxy groups is about 0.7 to 1.4:1.

13. The composition of claim 1 wherein X is

R contains 2 to 50 carbon atoms, and n is 2 to 6.

14. The composition of claim 13 wherein (A) is adipodi(nitrile carbonate).

15. The composition of claim 14 wherein (C) is zinc chloride or zinc bromide.

16. The composition of claim 2 wherein (B) is diglycidyl ether of p,p'-dihydroxydiphenyldimethylmethane.

17. The composition of claim 16 wherein (A) is adipodi(nitrile carbonate).

18. The composition of claim 17 wherein (C) is zinc chloride.

* * * * *

UNITED STATES PATENT OFFICE
CERTIFICATE OF CORRECTION

PATENT NO. : 3,960,813
DATED : June 1, 1976
INVENTOR(S) : Donald H. Russell et al It is certified that error appears in the above-identified patent and that said Letters Patent are hereby corrected as shown below:

Line 38 of Column 13, the word "oxirons"

should be --oxirane--.

Signed and Sealed this

Seventeenth Day of August 1976

[SEAL]

Attest:

RUTH C. MASON
Attesting Officer

C. MARSHALL DANN
Commissioner of Patents and Trademarks